US010917721B1

(12) United States Patent
Chae

(10) Patent No.: US 10,917,721 B1
(45) Date of Patent: Feb. 9, 2021

(54) DEVICE AND METHOD OF PERFORMING AUTOMATIC AUDIO FOCUSING ON MULTIPLE OBJECTS

(71) Applicant: LG ELECTRONICS INC., Seoul (KR)

(72) Inventor: Jonghoon Chae, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/830,203

(22) Filed: Mar. 25, 2020

(30) Foreign Application Priority Data

Oct. 23, 2019 (KR) .................. 10-2019-0132343

(51) Int. Cl.
| | |
|---|---|
| *H04R 3/00* | (2006.01) |
| *G11B 27/34* | (2006.01) |
| *G10L 25/51* | (2013.01) |
| *G10L 15/22* | (2006.01) |
| *G10L 15/02* | (2006.01) |
| *H04R 1/40* | (2006.01) |

(52) U.S. Cl.
CPC .............. *H04R 3/005* (2013.01); *G10L 15/02* (2013.01); *G10L 15/22* (2013.01); *G10L 25/51* (2013.01); *G11B 27/34* (2013.01); *H04R 1/406* (2013.01)

(58) Field of Classification Search
CPC ......... H04R 3/005; H04R 1/406; G10L 15/02; G10L 15/22; G10L 25/51; G11B 27/34
See application file for complete search history.

(56) References Cited

U.S. PATENT DOCUMENTS

| | | | | |
|---|---|---|---|---|
| 2013/0342731 | A1* | 12/2013 | Lee .................... | H04N 5/23218 348/231.4 |
| 2014/0376728 | A1* | 12/2014 | Ramo .................. | G06T 19/006 381/56 |
| 2017/0364752 | A1* | 12/2017 | Zhou ...................... | H04R 1/326 |
| 2018/0288307 | A1* | 10/2018 | Allie .................. | H04N 5/23212 |
| 2019/0174246 | A1* | 6/2019 | De Bruijn ................ | H04R 3/12 |

* cited by examiner

*Primary Examiner* — Mishawn N. Hunter
(74) *Attorney, Agent, or Firm* — Lee, Hong, Degerman, Kang & Waimey

(57) ABSTRACT

The present disclosure relates to a device and method of providing automatic audio focusing, the method includes: registering objects of interest; capturing a video; displaying the video on a display; recognizing at least one object included in the video; inferring at least one object of interest included in the video from the recognized at least one object; identifying distribution of the at least one object of interest in the video; and performing audio focusing on the at least one object of interest by adjusting activity of each of multiple microphones included in a microphone array on the basis of the distribution of the at least one object of interest in the video, whereby it is possible to emphasize voice of the object of interest during the video capturing of the electronic device, thereby improving the satisfaction with the video capturing result.

20 Claims, 10 Drawing Sheets

10　　　31　　　33　　　20

DEVICE AND METHOD OF PERFORMING AUTOMATIC AUDIO FOCUSING ON MULTIPLE OBJECTS

CROSS REFERENCE TO RELATED APPLICATIONS

Pursuant to 35 U.S.C. § 119(a), this application claims the benefit of earlier filing date and right of priority to Korean Patent Application No. 10-2019-0132343 filed Oct. 23, 2019, the contents of which are hereby incorporated by reference herein in its entirety.

BACKGROUND

Modern electronic devices have microphones for obtaining sounds while simultaneously capturing video using a camera. In general, a microphone obtains a variety of surrounding sounds that acts as noise along with the desired sound. Accordingly, in order to increase the satisfaction of a user, an audio focusing technique for obtaining only a desired sound is required.

Recently, products related to audio focusing have been produced, but so far, the audio focusing has been performed only in a direction in which there is a single object selected manually or in association with image adjustment.

SUMMARY

An audio focusing technique is applied to video shooting of electronic devices, but there is a limitation in providing satisfactory shooting because audio focusing is performed on only one object of interest according to a user's input or user's image adjustment.

Various embodiments of the present disclosure may provide an electronic device and method of providing automatic audio focusing without a user input.

In addition, various embodiments of the present disclosure may provide an electronic device and method of performing automatic audio focusing by inferring an object of the user's interest and analyzing the importance of the object of the user's interest.

The technical problem to be achieved in this disclosure is not limited to the technical problem mentioned above, and other technical problems not mentioned above may be clearly understood by those skilled in the art from the following description.

According to various embodiments of the present disclosure, a device may comprise a camera configured to capture a video, a microphone array composed of multiple microphones, a display configured to display the video and at least one processor configured to register objects of interest, cause a display of the captured video on the display, recognize at least one object included in the captured video, infer at least one object of interest included in the captured video from the recognized at least one object, identify distribution of the inferred at least one object of interest and perform audio focusing on the at least one object of interest by adjusting activity of each of the multiple microphones based on the identified distribution of the inferred at least one object of interest.

According to various embodiments of the present disclosure, a method of operating a device may comprise registering objects of interest, capturing a video, displaying the captured video on a display, recognizing at least one object included in the captured video; inferring at least one object of interest included in the captured video from the recognized at least one object, identifying distribution of the inferred at least one object of interest and performing audio focusing on the at least one object of interest by adjusting activity of each of multiple microphones included in a microphone array based on the identified distribution of the inferred at least one object of interest.

The electronic device and method according to various embodiments of the present disclosure can provide automatic audio focusing on an object of interest, thereby improving the satisfaction with the video capturing result.

The electronic device and method according to various embodiments of the present disclosure can provide automatic audio focusing on an object of interest by inferring an object of the user's interest and analyzing the importance of the object of the user's interest.

The electronic device and method according to various embodiments of the present disclosure can provide audio focusing on multiple objects of interest that make the speech, thereby emphasizing the speech made by the multiple objects.

The electronic device and the method according to various embodiments of the present disclosure can analyze feature of the speech generated by the object of interest and generate an emphasis filter, thereby further emphasizing the speech generated by the object.

The electronic device and the method according to various embodiments of the present disclosure can emphatically record the speech of the object of interest while shooting a video, thereby increasing the satisfaction of the video capturing result.

Effects obtained in the present disclosure are not limited to the above-mentioned effects, and other effects not mentioned above may be clearly understood by those skilled in the art from the following description.

BRIEF DESCRIPTION OF THE DRAWINGS

In connection with the description of the drawings, the same or similar reference numerals may be used for the same or similar components.

DETAILED DESCRIPTION OF THE EMBODIMENTS

Figure 1:
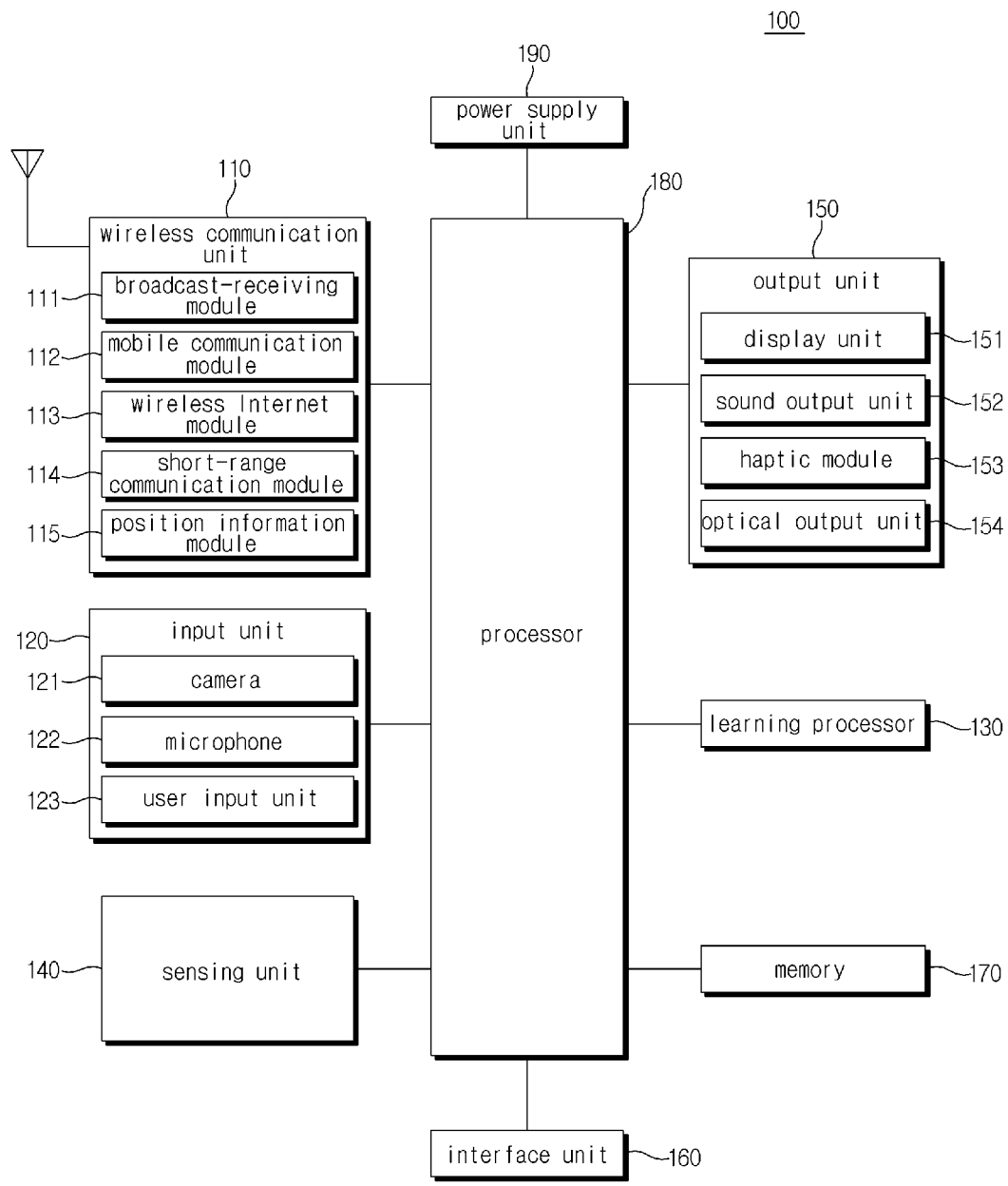
FIG. 1 is a block diagram illustrating an electronic device for performing automatic audio focusing according to various embodiments of the present disclosure.

Hereinafter, embodiments of the present disclosure will be described in detail with reference to the accompanying drawings, in which the same or similar components will be given the same reference numerals, and redundant description thereof will be omitted.

The suffixes "module" or "unit" for components used in the following description are given or mixed in consideration of ease of specification, and do not have distinct meanings or roles. In addition, "module" or "unit" means a hardware component such as software or a field programmable gate array (FPGA) or an application specific integrated circuit (ASIC), and the "unit" or "module" performs certain roles. However, "unit" or "module" is not limited to software or hardware. The "unit" or "module" may be configured to be positioned in an addressable storage medium or may be configured to regenerate one or more processors. Thus, as an example, the "unit" or "module" may include components such as software components, object-oriented software components, class components, and task components, processes, functions, properties, procedures, subroutines, segments of program code, drivers, firmware, microcode, circuitry, data, databases, data structures, tables, arrays, and variables. Functions provided within components and "unit" or "modules" may be separated into smaller numbers of components and "units" or "modules" or integrated into additional components and "unit" or "modules".

The steps of a method or algorithm described in connection with some embodiments of the present disclosure may be embodied directly in hardware module, software module, or a combination thereof, executed by a processor. The software module may reside in RAM memory, flash memory, ROM memory, EPROM memory, EEPROM memory, registers, hard disk, removable disk, CD-ROM, or any other type of recording medium known in the art. An exemplary recording medium is coupled to the processor, which can read information from and write information to the storage medium. In the alternative, the recording medium may be integral to the processor. The processor and the recording medium may reside in an application specific integrated circuit (ASIC). The ASIC may reside in a user terminal.

In the following description of the embodiments disclosed herein, if it is determined that the detailed description of the related known technology may obscure the gist of the embodiments disclosed herein, the detailed description thereof will be omitted. In addition, since the accompanying drawings are intended to facilitate understanding of the embodiments disclosed herein, it should be understood that the technical scope disclosed in the present specification is not limited by the accompanying drawings and includes all changes, equivalents, and substitutes included in the spirit and scope of the present disclosure.

Terms including ordinal numbers such as first and second may be used to describe various components, but the components are not limited by the terms. The terms are used only for the purpose of distinguishing one component from another.

When it is said that a component is "connected" or "coupled" to another component, the component may be directly connected to or coupled to that other component, but it should be understood that another component may exist between them. On the other hand, when it is said that a component is "directly connected" or "directly coupled" to another component, it should be understood that no other component may exist between them.

Audio focusing described below may be also referred to as audio zooming, in which, in order to allow the speech of a specific object to be emphatically obtained more than the speech of other surrounding objects, audio focusing is defined as a technique of focusing the direction of the microphone array on the specific object.

In addition, allocating of audio focusing may be defined as a technique in which speech of multiple objects of interest are emphatically obtained more than speech of other surrounding objects, by dividing the degree of focusing the direction of the microphone array on each object of interest.

FIG. 1 is a block diagram illustrating an electronic device 100 for performing automatic audio focusing according to various embodiments of the present disclosure.

The electronic device 100 illustrated in FIG. 1 is mobile electronic devices such as a mobile phone, a smart phone, a laptop computer, an artificial intelligence device for digital broadcasting, a personal digital assistant (PDA), a portable multimedia player (PMP), navigation, and a slate PC, tablet PC, an Ultrabook, a wearable device (e.g., a smartwatch, smart glasses, a head mounted display (HMD)), and the like, or a fixed electronic device such as a refrigerator, a washing machine, a smart TV, a desktop computer, a digital signage, and the like. In addition, the electronic device 100 may be a fixed or movable robot.

According to an embodiment of a configuration of the electronic device 100 illustrated in FIG. 1, each component may be configured with one chip, component, or electronic circuit, or may be configured with a combination of chips, components, or electronic circuits. According to another embodiment, some of the components shown in FIG. 1 may be separated into several components and may be configured with different chips, components, or electronic circuits; or several components may be combined to form a single chip, component, or electronic circuit. In addition, according to another embodiment, some of the components shown in FIG. 1 may be deleted or components not shown in FIG. 1 may be added. For example, in the case of a desktop computer, the wireless communication unit 110 shown in FIG. 1 may be deleted, and a wired communication unit including Ethernet and/or a LAN may be added.

Referring to FIG. 1, the electronic device 100 according to various embodiments of the present disclosure may include a wireless communication unit 110, an input unit 120, a learning processor 130, a sensing unit 140, an output unit 150, and an interface unit 160, a memory 170, a processor 180, and a power supply 190.

According to various embodiments of the present disclosure, the wireless communication unit 110 may include at least one of a broadcast receiving module 111, a mobile communication module 112, a wireless internet module 113, a local area communication module 114, and a location information module 115.

The broadcast receiving module 111 may receive a broadcast signal and/or broadcast related information from an external broadcast management server through a broadcast channel.

The mobile communication module 112 may transmit and receive a radio signal for data communication with at least one of a base station, an external terminal, a server on a mobile communication network built according to technical standards or communication schemes for mobile communication (e.g., Global System for Mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), long term evolution-advanced (LTE-A), and the like).

The wireless internet module 113 refers to a module for wireless internet access and may be disposed internal and external to the electronic device 100. The wireless internet module 113 may transmit and receive wireless signals for data communication in a communication network according to wireless internet technologies.

The wireless internet technology includes, for example, wireless LAN (WLAN), wireless-fidelity (Wi-Fi), Wi-Fi Direct, digital living network alliance (DLNA), wireless broadband (WiBro), world interoperability for microwave access (WiMAX), high speed downlink packet access (HSDPA), high speed uplink packet access (HSUPA), long term evolution (LTE), long term evolution-advanced (LTE-A), and the like.

The local area communication module 114 is used for local area communication and supports the local area communication by using at least one of Bluetooth™, radio frequency identification (RFID), infrared data association (IrDA), ultra-wideband (UWB), ZigBee, near field communication (NFC), wireless-fidelity (Wi-Fi), Wi-Fi Direct, and wireless universal serial bus (USB).

The location information module 115 is a module for obtaining the location (or current location) of the electronic device 100, and a representative example thereof includes a global positioning system (GPS) module or a wireless fidelity (WiFi) module. For example, when the electronic device 100 utilizes the GPS module, the electronic device 100 may obtain the location of the electronic device 100 using a signal transmitted from a GPS satellite.

The input unit 120 may include a camera 121 for inputting an image signal, a microphone 122 for receiving an audio signal, and a user input unit 123 for receiving information from a user. According to an embodiment of the present disclosure, the camera 121 may include a plurality of cameras that performs capturing in directions different from each other, and the microphone 122 may include a plurality of microphones constituting the directional microphone array.

The voice data or image data collected by the input unit 120 may be analyzed and processed according to control commands of a user.

The camera 121 processes an image frame such as a still image or a video obtained by an image sensor in a video call mode or a capturing mode. The processed image frame may be displayed on the display unit 151 or stored in the memory 170.

The microphone 122 processes external sound signals into electrical voice data. The processed voice data may be utilized in various ways according to a function (or an application program being executed) performed by the electronic device 100. Meanwhile, various noise reduction algorithms may be implemented in the microphone 122 in order to remove noises generated during receiving the external sound signals.

The user input unit 123 is used for receiving information from a user. When information is input through the user input unit 123, the processor 180 may control an operation of the electronic device 100 to correspond to the input information.

The user input unit 123 may include a mechanical input means (or a mechanical key, such as a button, a dome switch, a jog wheel, a jog switch located at front/rear surface or side surface of the electronic device 100) and touch input means. As an example, the touch input means may include a virtual key, a soft key, or a visual key displayed on the touch screen through a software process, or include a touch key disposed on a region other than the region where the touch screen is located.

The sensing unit 140 may include one or more sensors for sensing at least one of information in the electronic device 100, surrounding environment information surrounding the electronic device 100, and user information.

For example, the sensing unit 140 may include at least one of a proximity sensor, an illumination sensor, a touch sensor, an acceleration sensor, a magnetic sensor, a gravity sensor, a gyroscope sensor, motion sensor, RGB sensor, infrared sensor (IR sensor), fingerprint scan sensor, ultrasonic sensor, optical sensor (e.g., camera, see 121), microphones (e.g., see 122), battery gauges, environmental sensors (e.g. barometers, hygrometers, thermometers, radiation sensors, heat sensors, gas sensors, etc.), chemical sensors (e.g. an electronic nose, a healthcare sensor, a biometric sensor, etc.). Meanwhile, the electronic device 100 disclosed in the present disclosure may use a combination of information detected by at least two or more of these sensors.

The output unit 150 is used to generate outputs related to visual, auditory, or tactile senses, and includes at least one of a display unit 151, a sound output unit 152, a haptic module 153, and a light output unit 154.

The display unit 151 displays (outputs) information processed by the electronic device 100. For example, the display unit 151 may display execution screen information of an application program operated in the electronic device 100, or user interface (UI) and graphic user interface (GUI) information according to the execution screen information.

The display unit 151 is structured in a manner as to have a layer structure with a touch sensor or be integrally formed with a touch sensor, thereby implementing a touch screen. The touch screen may function as a user input unit 123 providing an input interface between the electronic device 100 and the user, while providing an output interface between the electronic device 100 and the user.

The sound output unit 152 may output audio data received from the wireless communication unit 110 or stored in the memory 170 in a call signal reception mode, a call mode, a recording mode, a speech recognition mode, a broadcast reception mode, and the like.

The sound output unit 152 may include at least one of a receiver, a speaker, and a buzzer.

The haptic module 153 may generate various tactile effects that a user can feel. A representative example of the tactile effect generated by the haptic module 153 may include vibration.

The light output unit 154 outputs a signal for notifying event occurrence by using light from a light source of the electronic device 100. Examples of events occurring in the electronic device 100 may include message reception, call signal reception, a missed call, an alarm, a schedule notification, email reception, information reception through an application, and the like.

The interface unit 160 serves as a path to various types of external devices connected to the electronic device 100. The interface unit 160 may include at least one of a wired/wireless headset port, an external charger port, a wired/wireless data port, a memory card port, port connecting a device equipped with an identification module, an audio input/output (I/O) port, a video input/output (I/O) port, and an earphone port. In response to the connection of the external device to the interface unit 160, the electronic device 100 may perform appropriate control related to the connected external device.

Meanwhile, the identification module is a chip that stores a variety of information for authenticating the use rights of the electronic device 100, and includes a user identification module (UIM), subscriber identity module (SIM), universal subscriber identity module (USIM), and the like. The device equipped with the identification module (hereinafter referred to as an "identification device") may be manufactured in the form of a smart card. Therefore, the identification device may be connected to the electronic device 100 through the interface unit 160.

The memory 170 stores data supporting various functions of the electronic device 100. The memory 170 may store multiple application programs or applications that are driven in the electronic device 100, data used for operating the electronic device 100, instructions, and data used for operation of the learning processor 130 (e.g., at least one algorithm information for machine learning, etc.).

The power supply unit 190 may supply power to each component included in the electronic device 100 by receiving an external power source or an internal power source under the control of the processor 180. The power supply unit 190 includes a battery, which may be a built-in battery or a replaceable battery.

The processor 180 may determine or predict at least one executable operation of the electronic device 100 on the basis of information generated or determined using data analysis and machine learning algorithm. To this end, the processor 180 may request, search, receive, or utilize data of the learning processor 130, and control the electronic device 100 to perform a predicted operation or an operation determined to be desirable among the at least one executable operation.

The processor 180 may perform various functions for implementing intelligent emulation (i.e., a knowledge based system, an inference system, and a knowledge acquisition system). The functions may be applied to various types of systems (e.g., fuzzy logic systems), including adaptive systems, machine learning systems, artificial neural networks, and the like.

The processor 180 may also include sub-modules that enable operations involving speech and natural language speech processing, such as an I/O processing module, an environmental condition module, a speech-to-text (STT) processing module, a natural language processing (NLP) module, a workflow processing module, and a service processing module.

Each of these submodules may have access to one or more systems, or data and model, or a subset or super set thereof, in the electronic device 100. In addition, each of these submodules may provide various functions, including lexical index, user data, workflow model, service model, and automatic speech recognition (ASR) system.

According to other embodiments, other aspects of the processor 180 or the electronic device 100 may be implemented with the submodule, system, or data and model.

According to some embodiments, based on data of the learning processor 130, the processor 180 may be configured to detect requirements on the basis of a user's intention or a contextual condition expressed in user input or natural language input.

The processor 180 may actively derive and obtain the information required to fully determine the requirements on the basis of the contextual condition or the user's intention. For example, the processor 180 may actively derive the information required to determine the requirements by analyzing historical data, including historical input and output, pattern matching, unambiguous words, input intent, and the like.

The processor 180 may determine a flow of operations for executing a function in response to the requirement on the basis of the contextual condition or the user's intention.

The processor 180 collects, detects, extracts, and/or receives signals or data used for data analysis and machine learning tasks through one or more sensing components in the electronic device 100 to collect information for processing and storage in the learning processor 130.

The information collection may include sensing information via a sensor, extracting information stored in memory 170, receiving information from another electronic device, entity, or external storage device via a communication means, and so on.

The processor 180 may collect and store usage history information of the electronic device 100.

The processor 180 can use the stored usage history information and predictive modeling to determine the best match in which a particular function is executed.

The processor 180 may receive or detect surrounding environment information or other information through the sensing unit 140.

The processor 180 may receive a broadcast signal and/or broadcast related information, a wireless signal, and wireless data through the wireless communication unit 110, and may communicate with an external electronic device.

The processor 180 may receive image information (or a corresponding signal), audio information (or a corresponding signal), data, or user input information from the input unit 120.

The processor 180 collects information in real time, processes or classifies the information (e.g., knowledge graph, command policy, personalization database, conversation engine, etc.), and stores the processed information in the memory 170 or the learning processor 130.

When the operation of the electronic device 100 is determined on the basis of data analysis and machine learning algorithms and techniques, the processor 180 may control components of the electronic device 100 to perform the determined operation. The processor 180 may control the electronic device 100 according to the control command, thereby performing the determined operation.

When a specific operation is executed, the processor 180 analyzes historical information indicating execution of the specific operation through data analysis and machine learning algorithms and techniques, and updates the previously learned information on the basis of the analyzed information.

Accordingly, the processor 180 may improve accuracy of future performance of data analysis and machine learning algorithms and techniques on the basis of the updated information, together with the learning processor 130.

The processor 180 typically controls the overall operation of the electronic device 100 in addition to the operations associated with the application program. For example, when the state of the electronic device 100 satisfies a set condition, the processor 180 may execute or release a lock state that restricts an input of a user's control command to the applications.

The processor 180 may process signals, data, information, or the like input or output through the above-described components or operate the application program stored in the memory 170, thereby providing or processing information or functions that are suitable for the user.

In addition, the processor 180 may control at least some of the components shown in FIG. 1 to operate the application program stored in the memory 170. In addition, the processor 180 may operate a combination of at least two of the components included in the electronic device 100 in combination with each other to run the application program.

The learning processor 130 may be configured to receive, classify, store, and output information to be used for data mining, data analysis, intelligent decision making, and machine learning algorithms and techniques.

The learning processor 130 may include one or more memory units configured to store data, which is received, detected, sensed, generated, and predefined by the electronic device 100; is received, detected, sensed, generated, and predefined using other methods; or is outputted by other components, devices, electronic devices, or devices in communication with the electronic device.

The learning processor 130 may include a memory integrated with or implemented in the electronic device 100. According to some embodiments, the learning processor 130 may be implemented using the memory 170.

Alternatively or additionally, the learning processor 130 may be implemented using a memory associated with the electronic device 100, such as an external memory coupled directly to the electronic device 100, or a memory maintained in a server in communication with the electronic device 100.

In another embodiment, the learning processor 130 may be implemented using a memory maintained in a cloud computing environment, or another remote memory accessible by the electronic device 100 through a communication scheme such as a network.

The learning processor 130 may be typically configured to store data in one or more databases, in order to perform supervised learning, unsupervised learning, reinforcement learning, data mining, predictive analytics, or identify, index, categorize, manipulate, store, retrieve, and output the data for use in other electronic devices.

The information stored by the learning processor 130 may be used by one or more other controllers of the processor 180 or the electronic device 100 using any of a variety of different types of data analysis algorithms and machine learning algorithms.

Examples of such algorithms include k-near neighbor systems, fuzzy logic (e.g. probability theory), neural networks, Boltzmann machines, vector quantization, pulse neural networks, support vector machines, maximum margin classifiers, hill climbing, inductive logic systems Bayesian networks, Peretnets (e.g., finite state machines, Millie machines, Moore finite state machines), classifier trees (e.g., Perceptron tree, support vector tree, Markov tree, decision tree forest, random forest), Pandon model and system, artificial fusion, sensor fusion, image fusion, reinforcement learning, augmented reality, pattern recognition, automated planning, and the like.

The learning processor 130 may store an artificial neural network (ANN) model used in a machine learning algorithm in a memory, store a learning model generated by training the artificial neural network model, and perform operations such as classification, detection, and recognition on the basis of data input by using the learning model.

Artificial intelligence refers to the field of researching artificial intelligence or methodology to produce the same, and machine learning refers to the field of researching methodology to define and solve various problems dealt in the field of artificial intelligence. The machine learning may be defined as an algorithm that improves the performance of any task through a steady experience on the task.

An artificial neural network is a model used for the machine learning, and may refer to a model having a problem solving ability, which is composed of artificial neurons (nodes) forming a network via synaptic coupling. The artificial neural network may be defined by a connection pattern between neurons of another layer, a learning process of updating model parameters, and an activation function of generating an output value.

Figure 2:
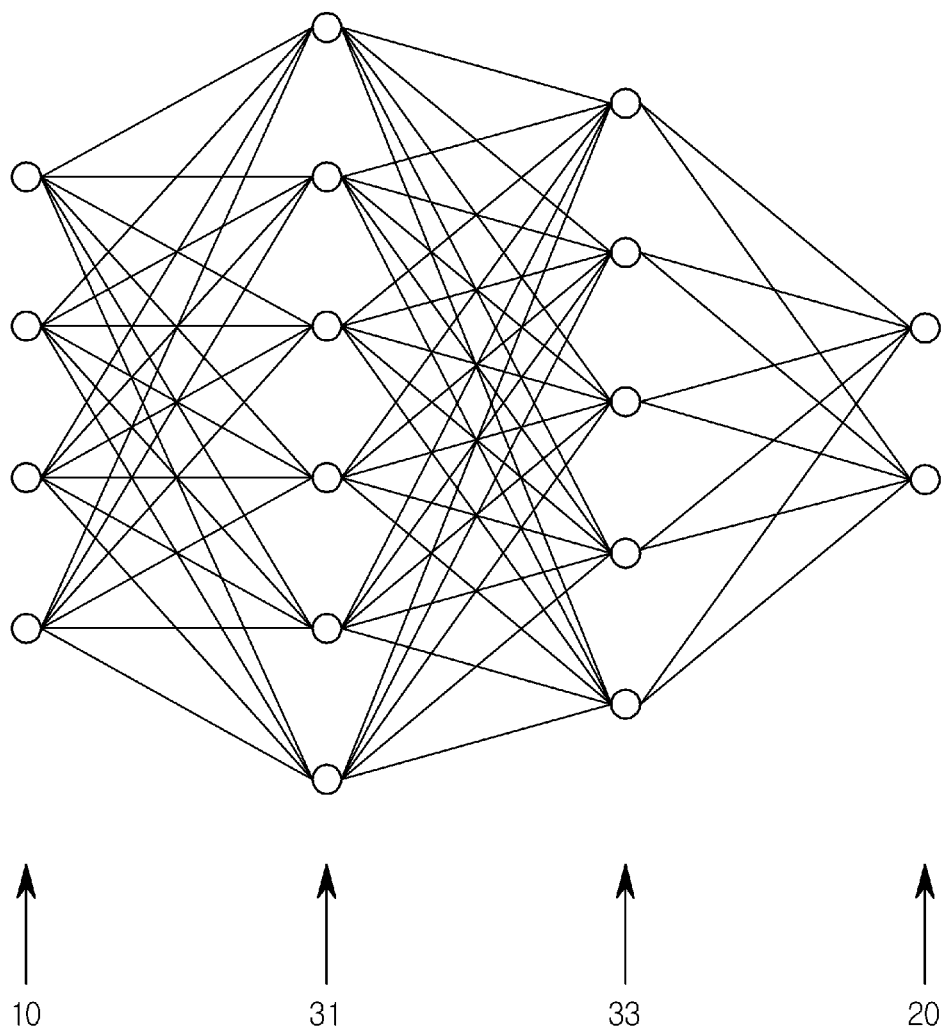
FIG. 2 is a diagram illustrating an example of a fully connected artificial neural network structure.

FIG. 2 is a diagram illustrating an example of a fully connected artificial neural network structure.

Referring to FIG. 2, an artificial neural network may include an input layer 10, an output layer 20, and optionally one or more hidden layers 31 and 33. Each layer includes one or more nodes corresponding to neurons in the neural network, and the artificial neural network may include synapses that connect between nodes in one layer and nodes in another layer. In the artificial neural network, a node may receive input signals input through a synapse, and generate an output value on the basis of an activation function of weights and deflections for each input signal. The output value of each node may act as an input signal of the next layer through synapses. An artificial neural network in which all nodes of one layer and all nodes of the next layer are connected to each other through synapses may be referred to as a fully connected artificial neural network.

The parameters of the artificial neural network model mean parameters determined through learning, and may include weights of synaptic connections and deflections of neurons. In addition, a hyper parameter refers to a parameter that should be set before learning in the machine learning algorithm, and may include a learning rate, the number of repetitions, a minimal batch size, an initialization function, and the like.

Machine learning, which is implemented by a deep neural network (DNN) including multiple hidden layers among artificial neural networks, is referred to as deep learning, and the deep learning is a part of machine learning. Hereinafter, machine learning may be used to include depth learning.

Figure 3:
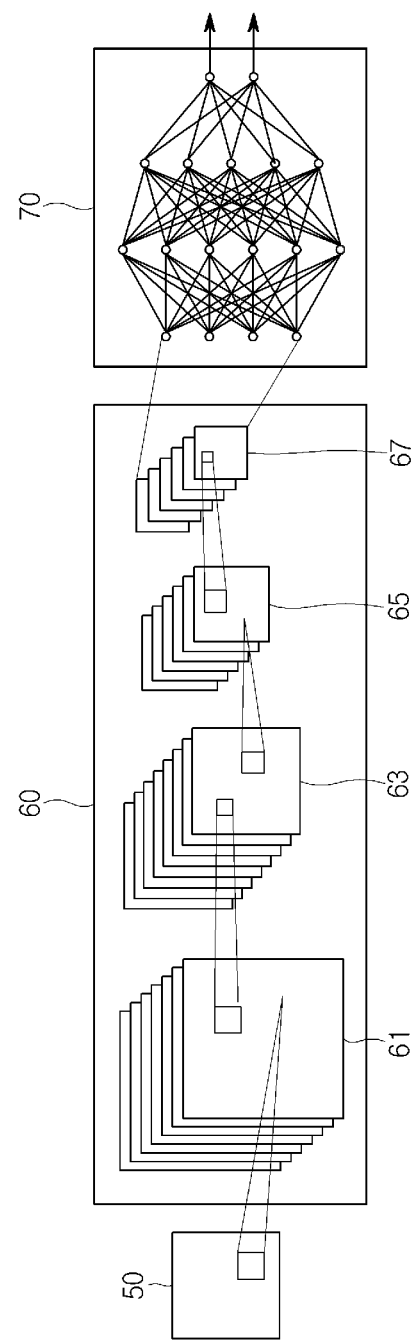
FIG. 3 is a diagram illustrating an example of a convolutional neural network (CNN) structure, which is a type of deep neural network.

FIG. 3 is a diagram illustrating an example of a convolutional neural network (CNN) structure, which is a type of a deep neural network.

A convolutional neural network as shown in FIG. 3 may be more effective in identifying structural spatial data such as images, video, and text strings. The convolutional neural network may effectively recognize features of adjacent images while maintaining spatial information of the images.

Referring to FIG. 3, the convolutional neural network may include a feature extraction layer 60 and a classification layer 70. The feature extraction layer 60 may synthesize things located spatially close to the image using a convolution, thereby extracting a feature of the image.

The feature extraction layer 60 may be configured with multiple convolutional layers 61 and 65 and multiple pooling layers 63 and 67. The convolutional layers 61 and 65 may be obtained by applying a filter and then an activation function to input data. The convolutional layers 61 and 65 may include multiple channels, and filters and/or activation functions different from each other may be applied to each channel. The result of the convolutional layers 61, 65 may be a feature map. The feature map may be data in the form of a two-dimensional matrix. The pooling layers 63 and 67 may receive output data of the convolutional layers 61 and 65, i.e., feature map, as inputs, and may be used to reduce the size of the output data or to emphasize specific data. The pooling layers 63 and 67 may generate output data by applying max pooling that selects a maximum value, average pooling that selects an average value, and min pooling that selects a minimum value, among some data of the output data of the convolutional layers 61 and 65.

The feature map created through a series of convolutional layers and pooling layers may become gradually smaller in size. The final feature map generated through the last convolutional layer and pooling layer may be converted into a one-dimensional form and input into the classification layer 70. The classification layer 70 may be the fully connected artificial neural network structure shown in FIG. 2. The number of input nodes in the classification layer 70 may be equal to that obtained by multiplying the number of elements in the matrix of the final feature map by the number of channels.

In addition to the convolutional neural network above-described as a deep neural network structure, a recurrent neural network (RNN), a long short term memory network (LSTM), gated recurrent units (GRU), and the like may be used. The recurrent neural network may perform classification or prediction by learning sequential data, and has a cyclic structure inside so that the past learning is multiplied by a weight and reflected in the current learning. Thus, the current output result is affected by the output result in the past, and the hidden layer serves as a kind of memory function. The recurrent neural network may be used for analyzing a speech waveform to perform a machine translation, identifying components before and after sentence in a text to generate the text, or recognizing speech.

The artificial neural network learning has an adjective to determine model parameters that minimize a loss function. The loss function may be used as an index for determining an optimal model parameter in the learning process of the artificial neural network. In the case of a fully connected artificial neural network, a weight of each synapse may be determined through learning, and in the case of a convolutional neural network, a filter of a convolutional layer for extracting the feature map may be determined through learning.

The machine learning may be categorized into supervised learning, unsupervised learning, and reinforcement learning.

The supervised learning may mean a method of learning the artificial neural network in a state that a label for learning data is given, in which the label may mean a correct answer (or result value) that the artificial neural network should infer when the learning data is input to the artificial neural network. The unsupervised learning may mean a method of learning the artificial neural network in a state that a label for learning data is not given. The reinforcement learning may mean a method of learning the artificial neural network so that an agent defined in any environment selects an action or a sequence of actions that maximizes cumulative rewards in each state.

Figure 4:
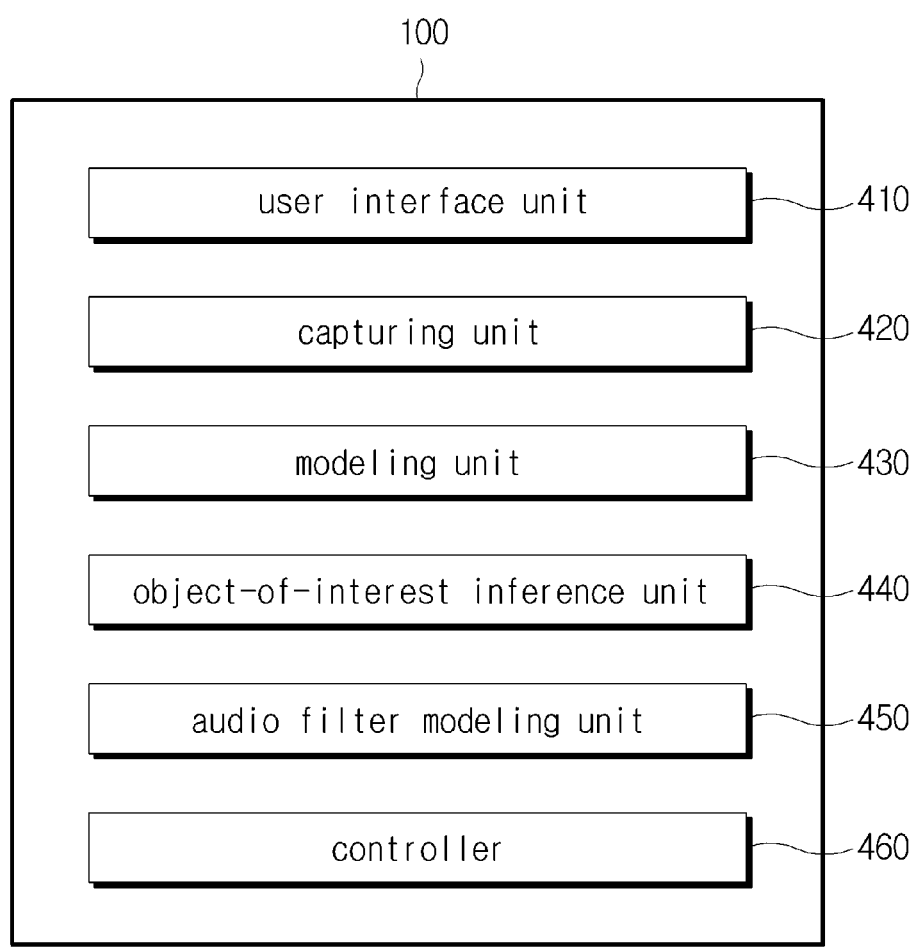
FIG. 4 is a block diagram illustrating components that are performed by at least one processor of an electronic device according to various embodiments of the present disclosure.

FIG. 4 is a block diagram illustrating components that are performed by at least one processor of an electronic device according to various embodiments of the present disclosure.

The components shown in FIG. 4 may be software programs or application modules that may be executed by the processor 180 and/or the learning processor 130 of FIG. 1. Some components may be implemented as separate chips, ASICs, or FPGAs designed to operate only the corresponding component. Herein, the component may be considered as a hardware module. In addition, the at least one processor may include a general purpose processor and a chip, an ASIC, or an FPGA designed to perform a specific function or configuration. The configuration shown in FIG. 4 is just only one embodiment. According to another embodiment, one component shown in FIG. may be divided into several components, or several components are integrated into each other to form one component. In addition, according to another embodiment, some of the components shown in FIG. 4 may be deleted or components not shown in FIG. 4 may be added.

Referring to FIG. 4, the electronic device 100 may include a user interface unit 410, a capturing unit 420, a modeling unit 430, an object-of-interest inference unit 440, and a controller 460. An audio filter modeling unit 450 may be additionally included.

According to various embodiments of the present disclosure, the user interface unit 410 may receive a command from the user or control the output unit 150 to provide information to the user. According to an embodiment of the present disclosure, the user interface unit 410 may control the output unit 150 so that an image received from the capturing unit 420 is displayed on the screen of the display unit 151. In addition, the user interface unit 410 may obtain tag input information when a user performs a tag input operation. According to an embodiment, the user interface unit 410 may obtain coordinate information touched by a user or coordinate information clicked by a mouse on the touch screen.

Figure 5A:
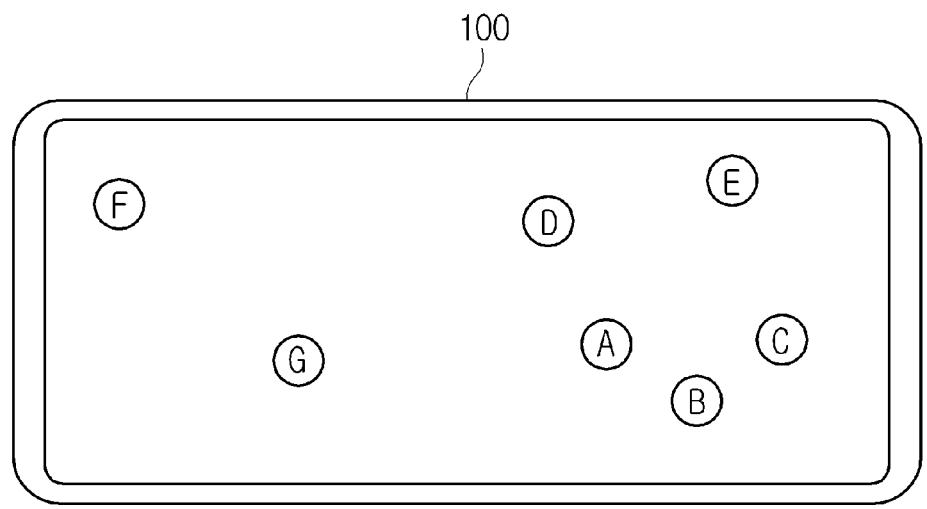
FIGS. 5A and 5B are diagrams illustrating an example of a user interface that receives a user input to select an object of interest according to various embodiments of the present disclosure.
Figure 5B:
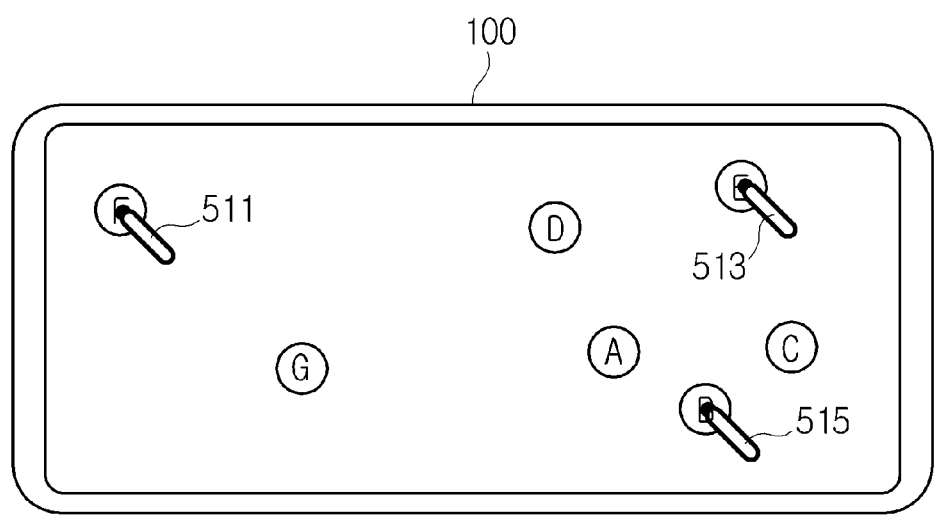

FIGS. 5A and 5B are diagrams illustrating an example of a user interface that receives a user input to select an object of interest according to various embodiments of the present disclosure. FIGS. 5A and 5B may be displayed on the screen of the display 151 under the control of the user interface unit 410.

FIG. 5A illustrates an embodiment in which a video captured by a camera is displayed on a screen of the display 151. Referring to FIG. 5A, according to an embodiment, the user interface unit 410 of the processor 180 may display an image including objects A through G captured by the camera 121 on the display 151. The user may select at least one object which is to be subject to audio focusing from among the objects displayed on the display 151.

According to an embodiment of FIG. 5B, it may be seen that, based on the user's input, a single touch input 511 for an object F, a single touch input 513 for an object E, and a single touch input 515 for an object B are generated in the user interface unit 410. The user interface unit 410 may transmit, to the capturing unit 420, tagging information indicating that there has been a touch for selecting an object of the user's interest as the object.

According to various embodiments of the present disclosure, the capturing unit 420 may photograph a video. The captured video may include image data and voice data. The capturing unit 420 may scan the speech using a directional microphone array composed of a plurality of microphones. Here, the scanning may mean obtaining voice data while sequentially changing the direction in which the microphone array is directed. The capturing unit 420 may store the captured video in the memory 170. Herein, when a user performs a touch input, it is possible to store the video together with the tagging information from the user interface unit 410.

According to various embodiments of the present disclosure, the modeling unit 430 may select an object of interest by extracting and classifying objects included in the video on the basis of the video captured by the capturing unit 420. The modeling unit 430 may extract an image feature and a voice feature of the selected object. The modeling unit 430 may register the selected object as an object of interest while storing the image features and voice features of the object in the memory 170. The image feature and the voice feature of the registered object of interest may be used later to determine whether the object of interest is included in the image by the object-of-interest inference unit 440.

According to various embodiments of the present disclosure, objects included in an image may be classified into a tagging object, a general object, or other objects. The tagging object may be an object of interest, and the general object may be an object which is capable of meaningful speech or in which the user is interested, such as a person or an animal. The other objects may be objects except the tagging object and the general object.

According to an embodiment of the present disclosure, the modeling unit 430 extracts an object using an image processing algorithm and then classifies objects included in a video through machine learning based on an artificial neural network model (e.g., artificial neural network of FIG. 2 and convolutional neural network of FIG. 3). According to another embodiment, the modeling unit 430 extracts and classifies objects included in a video through machine learning based on an artificial neural network model (e.g., artificial neural network of FIG. 2 and convolutional neural network of FIG. 3). The modeling unit 430 may be provided with a separate artificial neural network model for object extraction and classification.

The modeling unit 430 may use the artificial neural network model which has been already learned for object extraction or classification. The artificial neural network model for object recognition and classification may have been already learned through unsupervised learning that uses various images on the Internet as inputs in an external device. Thus, the learned artificial neural network model for recognizing and classifying objects may have been already made.

The modeling unit 430 may extract objects from all images and/or images stored in the memory 170 using the learned artificial neural network model. The modeling unit 430 may perform preprocessing so that the size, the angle of view, and the brightness of the corresponding image become similar as possible for all the extracted objects, and perform classification based on the similarity using the learned artificial neural network model.

The modeling unit 430 may select an object of interest after classification. According to an embodiment, the modeling unit 430 may select the tagged object as the object of interest. The image captured by the capturing unit 420 may be stored together with tagging information associated with a user's touch input. The modeling unit 430 may recognize the tagged object on the basis of the associated tagging information, and select the tagged object as the object of interest.

According to another embodiment, the modeling unit 430 may select an object of high frequency appearing in the image as the object of interest. For example, the modeling unit 430 may select a general object appearing in a video having a predetermined ratio (e.g., 0.7) or more of the entire video, as the object of interest. According to another embodiment, the modeling unit 430 may select both the tagged object and the object of high frequency, as the object of interest.

The modeling unit 430 may determine the importance of the object selected as the object of interest and store the same at the time of registration. According to an embodiment, the modeling unit 430 may set the importance on the basis of the number of times the object selected as the object of interest is tagged by the user. For example, the modeling unit 430 may set a high importance level for the object of interest with a large number of tagged times, and set a relatively low importance level for the object of interest with a small number of tagged times. According to another embodiment, the modeling unit 430 may determine the importance on the basis of the frequency in which each object of interest appears in the image stored in the memory 170. According to an embodiment of the present disclosure, the modeling unit 430 may set the importance to be high in the case of high frequency, and set the importance to be low in the case of relatively small frequency. The modeling unit 430 may store the set importance when registering the object of interest.

The modeling unit 430 may generate a learning model (hereinafter referred to as an image learning model) associated with image features learned through machine learning based on an artificial neural network model (e.g., convolutional neural network of FIG. 3) and a learning model (hereinafter, referred to as a voice learning model) associated with the voice feature learned though machine learning based on an artificial neural network model (e.g., recurrent neural network, artificial neural network of FIG. 2, and convolutional neural network of FIG. 3). The modeling unit 430 may train the image learning model through supervised learning that uses image data including the selected object as learning data and provides a value representing the selected object with a label. In addition, the modeling unit 430 may train the voice learning model through supervised learning that uses voice data of an image including the selected object as learning data and provides a value representing the selected object with a label. The image learning model and the voice learning model may be used later to determine whether the object of interest is included in the image by the object-of-interest inference unit 440.

The modeling unit 430 may update the above-described image learning model and/or the voice learning model when a new image is stored in the memory 170 by the user or when there is a tag input by the user.

According to various embodiments of the present disclosure, the audio filter modeling unit 450 may model a voice feature on the basis of voice data of an object of interest (tagging object) and generate a audio filter capable of emphasizing the speech of each object of interest. The audio filter may be applied when it is determined that the speech of the object of interest is received and may be used to emphasize the speech of the object of interest.

In addition, the audio filter modeling unit 450 may generate a voice filter for general objects other than objects of interest. According to an embodiment, the voice filter modeling unit 450 extracts common or main voice data from an image including only general objects after classification in the modeling unit 430, and models a voice feature on the basis of the extracted voice data, and generates a voice filter capable of emphasizing the speech of the general object on the basis of this modeling. The voice filter for the general object may be used to emphasize the speech of the general object in an image in which tagging objects are not present and only general objects are present.

According to various embodiments of the present disclosure, the object-of-interest inference unit 440 may infer whether the object of interest is included in the image captured by the capturing unit 420.

The object-of-interest inference unit 440 may detect the candidate direction and the candidate object by determining whether the voice data obtained using the directional micro array is similar to the voice feature of the object of interest. The voice data may be obtained in different directions by performing scanning using the directional microphone array in the capturing unit 420. The object-of-interest inference unit 440 may determine similarity by inputting voice data into the voice learning model generated by the modeling unit 430. The object-of-interest inference unit 440 may detect the candidate direction by recognizing the scanning direction of the voice data determined to be similar. Also, the object-of-interest inference unit 440 may also detect a candidate object on the basis of the result of the similarity determination of the object of interest. The object-of-interest inference unit 440 may apply a voice filter generated by the voice filter modeling unit 450 to the detected candidate object in order to increase the accuracy of the candidate direction and the candidate object detection. The speech of the candidate object may be emphasized by applying the voice filter, whereby the voice features may be identified more clearly.

The object-of-interest inference unit 440 may extract objects from the image data obtained by the capturing unit 420 and input the extracted objects to the image learning model, thereby determining the similarity with the object of interest. According to an embodiment, the object-of-interest inference unit 440 may preferentially perform image matching on the object that is located in the candidate direction detected via the similarity comparison of the voice data, thereby shortening the time that it takes to recognize the object of interest. According to an embodiment, the object-of-interest inference unit 440 may detect candidate objects on the basis of the image learning model. According to another embodiment, the object-of-interest inference unit 440 may compare the first candidate object obtained based on the voice learning model or the voice feature with the second candidate object obtained based on the image learning model or the image feature, thereby inferring a final object of interest. According to various embodiments, the number of final objects of interest may be one or more.

According to an embodiment, the object-of-interest inference unit 440 may determine that there are no objects of interest and there are only general objects among objects extracted from the image data obtained by the capturing unit 420. In addition, the object-of-interest inference unit 440 may determine that there are no objects of interest and general objects and there are only other objects among objects extracted from the obtained image data.

The controller 460 may determine the distribution of the inferred final objects of interest in the image currently captured and perform audio focusing. According to an embodiment, when multiple objects of interest are included in the image, the controller 460 may allocate audio focusing to each of the multiple objects of interest.

The controller 460 may control the capturing unit 420 such that the directional microphone array is directed to the location of the inferred final object of interest. When multiple objects of interest are included in the image, the controller 460 may allocate the directivity of the directional microphone array to the multiple objects of interest through audio focusing allocation. According to an embodiment, the controller 460 may perform audio focusing distribution by adjusting the activity of a plurality of microphones included in the directional microphone array. For example, the controller 460 performs controls so that a high activity is given for a microphone directed to the object of interest having a high importance, and low activity is given for a microphone directed to the object of interest having a low importance, thereby performing the audio focusing allocation.

The controller 460 may apply a voice filter. The controller 460 may apply a voice filter corresponding to each inferred object of interest so that the speech of the object of interest is emphasized.

When objects of interest are not present and only general objects are present in the image captured by the capturing unit 420, the controller 460 controls the capturing unit 420 so that the directional microphone array is directed into the location of the inferred general object. When only multiple general objects are included in the image, the controller 460 may allocate the directivity of the directional microphone array to each of the multiple general objects through audio focusing allocation. In addition, the controller 460 may control the capturing unit 420 so that the speech of the general object is emphasized by applying a voice filter for the general object.

Figure 6:
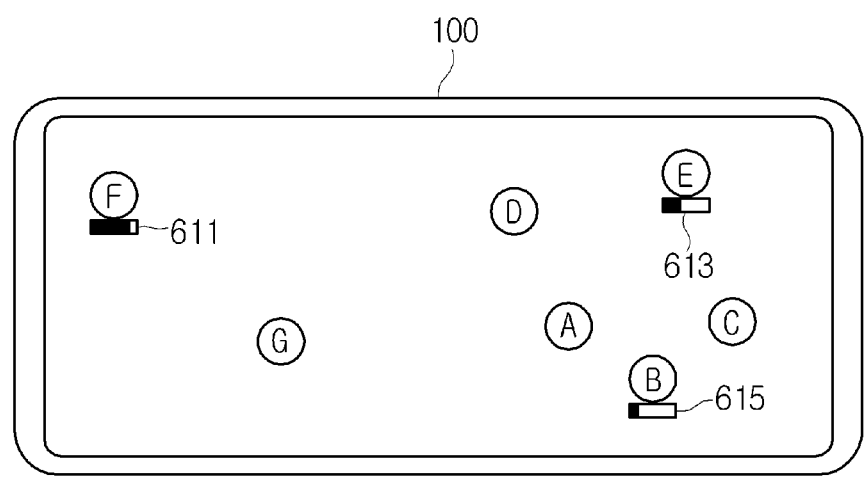
FIG. 6 is a diagram illustrating an audio focusing allocation result performed by an electronic device.
Figure 6:
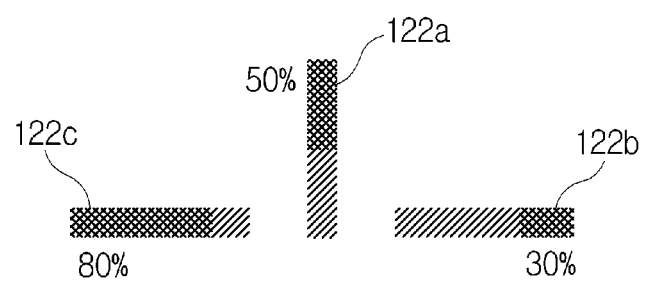

FIG. 6 is a diagram illustrating a result of audio focusing distribution performed by an electronic device 100.

Referring to FIG. 6, the objects of interest inferred by the object-of-interest inference unit 440 may be objects B, E, and F. Each object may have importance levels 611, 613, and 615 set differently from each other. In the example of FIG. 6, the importance of each object of interest is shown above each object of interest, but may not be shown on the screen displayed to the actual user. In the example of FIG. 6, the longer the length of a black bar, the higher the importance.

Referring to FIG. 6, the controller 460 may determine that an object F at the top left has the highest importance 611, an object E at the top right has the next importance 613, and an object B at the bottom right has the lowest importance 615. The controller 460 may allocate audio focusing by adjusting the activity of each of the microphones 122*a*, 122*b*, and 122*c* on the basis of the position and the importance of the object of interest. According to the example of FIG. 6, the controller 460 performs control so that a high activity (e.g., 80%) is given for a microphone 122*c* directed toward the object F with the highest importance, and a low activity (e.g., 30%) is given for a microphone 122*b* directed toward the object E and object B with less importance than the object F. In addition, the microphone 122*a* directed toward the center may be adjusted to have a medium activity (e.g., 50%). As shown in FIG. 6, the controller 460 performs control so that a high activity is given for the microphone 122*c* directed toward the object of high importance, thereby allocating most audio focusing to the object of interest of high importance. In addition, the controller 460 may apply a voice filter for the objects of interest B, E, and F.

According to various embodiments of the present disclosure, a device (e.g., an electronic device 100 of FIG. 1) may comprise a camera (e.g., camera 121 of FIG. 1) configured to capture a video, a microphone array (e.g., microphone 122 of FIG. 1 or microphones 122*a*, 122*b*, and 122*c* of FIG. 6) composed of multiple microphones, a display (e.g., display 151 of FIG. 1) configured to display a video, and at least one processor (e.g., processor 180 and learning processor 130 of FIG. 1) configured to register objects of interest, cause a display of the captured video on the display, recognize at least one object included in the captured video, infer at least one object of interest included in the captured video from the recognized at least one object, identify distribution of the inferred at least one object of interest and perform audio focusing on the at least one object of interest by adjusting activity of each of the multiple microphones based on the identified distribution of the inferred at least one object of interest in the video.

According to various embodiments, the at least one processor is further configured to identify a voice feature of each of the registered objects of interest, generate a voice filter capable of emphasizing the voice feature of at least one of the registered objects of interest, generate a voice filter capable of emphasizing the identified voice feature and apply the generated voice filter to the captured video to emphasize a voice of the inferred at least one object of interest.

According to various embodiments, the device may further comprise a memory configured to store the captured videos, wherein registering the objects of interest includes extracting an object from the captured videos stored in the memory, selecting an object with tagging information indicating that the object is selected as an object of interest, wherein the object is selected from among the extracted object and setting an importance of the selected object based on a number of times tagged by a user, wherein the selected object along with the set importance is registered as an object of interest.

According to various embodiments, the device may further comprise a memory configured to store the captured videos, wherein registering the objects of interest includes extracting an object from the captured videos stored in the memory, selecting an object based on an appearing frequency in the captured videos stored in the memory and setting an importance of the selected object based on the appearing frequency in the captured videos, wherein the selected object along with the set importance is registered as an object of interest.

According to various embodiments, registering the objects of interest includes generating an artificial neural network model trained for object clustering, extracting object images from the captured videos stored in the memory, preprocessing the extracted object images, inputting the preprocessed extracted object images into the generated artificial neural network model to cluster the preprocessed extracted object images with images having similar features and determining a frequency in which an object appears in the captured videos based on a number of object images included in the cluster.

According to various embodiments, inferring the at least one object of interest included in the captured video from the recognized at least one object includes obtaining voice data of the captured video while sequentially changing a direction in which the microphone array is focused, determining a similarity between a voice data feature of the captured video and a particular voice data feature of a registered object of interest from among the registered objects of interest to detect a candidate direction in which a particular object of interest is expected to be present, extracting an object that is in the candidate direction from the captured video and determining a similarity between an image feature of the extracted object and a particular image feature of the registered object of interest to infer the at least one object of interest.

According to various embodiments, inferring the at least one object of interest included in the captured video from the recognized at least one object includes obtaining voice data of the captured video while sequentially changing a direction in which the microphone array is focused, determining a similarity between a voice data feature of the captured video and a particular voice data feature of a registered object of interest from among the registered objects of interest to detect a first object capable of being a particular object of interest and a candidate direction in which the first object is expected to be present, extracting an object that is in the candidate direction from the captured video, determining a similarity between an image feature of the extracted object and a particular image feature of the registered object of interest to infer a second object and inferring a specific object included in both the detected first object and the inferred second object as the at least one object of interest.

According to various embodiments, determining the similarity between the voice data feature of the captured video and the particular voice data feature of the registered object of interest includes generating an artificial neural network model, obtaining voice data of the registered objects of interest from the captured videos stored in a memory, training the generated artificial neural network model by using the obtained voice data of the objects of interest to be classified according to a particular voice data feature of the objects of interest and inputting the obtained voice data into the generated artificial neural network to determine the similarity of the voice data feature with the objects of interest.

According to various embodiments, determining the similarity between the image feature of the extracted object and the particular image feature of the registered object of interest includes generating an artificial neural network model, obtaining image data of the registered objects of interest from the captured videos stored in a memory, training the generated artificial neural network model using the obtained image data of the object of interest to be classified according to a particular image feature of the objects of interest and inputting the obtained image data into the trained generated artificial neural network model to determine the similarity of the image feature of the extracted object with the objects of interest.

According to various embodiments, performing audio focusing includes allocating the audio focusing into the at least one object of interest by adjusting the activity of each of the multiple microphones based on multiple objects of interest being recognized.

Figure 7:
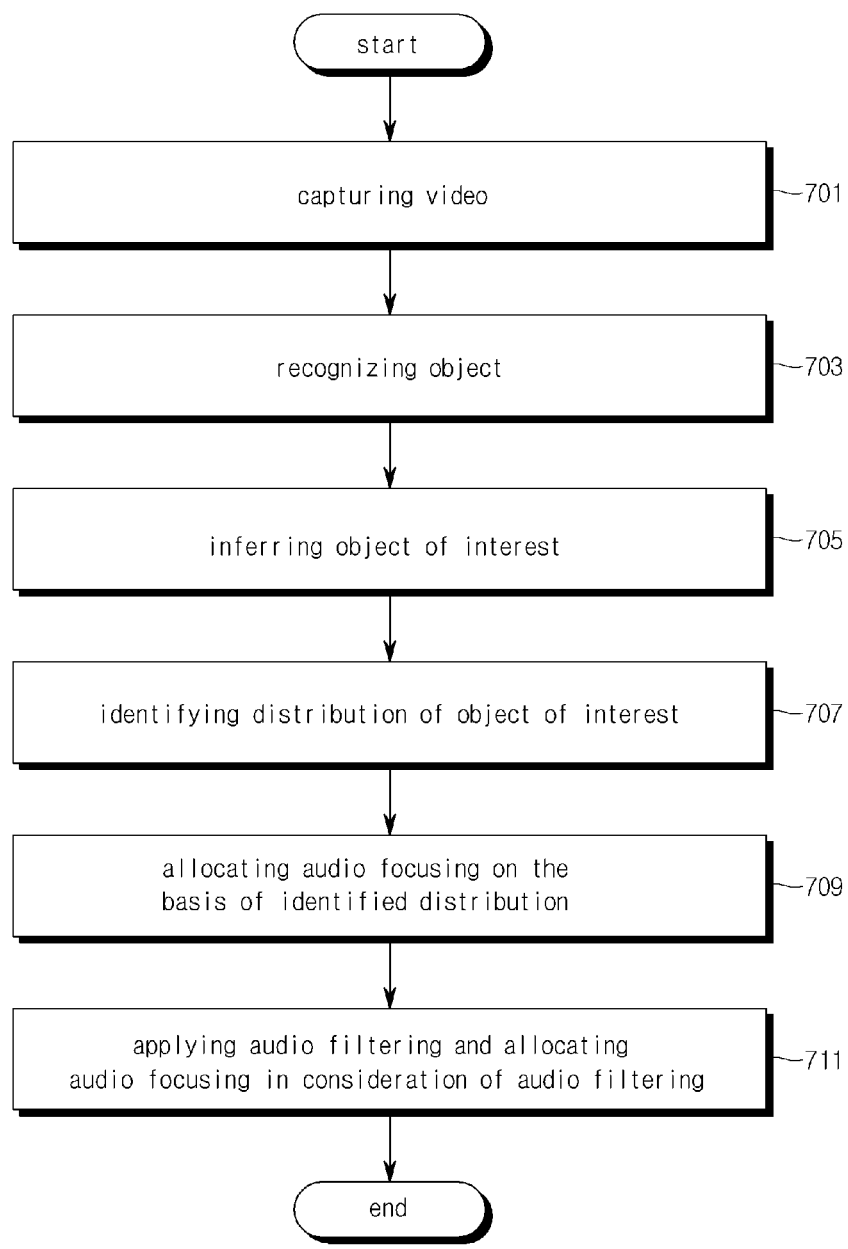
FIG. 7 is a flowchart illustrating an operation in which an electronic device automatically allocates audio focusing to at least one object of interest according to various embodiments of the present disclosure.

FIG. 7 is a flowchart illustrating an operation in which the electronic device 100 automatically allocates audio focusing to at least one object of interest according to various embodiments of the present disclosure. The operations according to the flowchart shown in FIG. 7 may be implemented by an electronic device (e.g., electronic device 100 of FIG. 1) or at least one processor (e.g., processor 180 or learning processor 130 of FIG. 1) of the electronic device.

Referring to FIG. 7, in operation 701, the electronic device 100 may capture a video using the camera 121 and display the captured video on the screen of the display 151. According to an embodiment of the present disclosure, the electronic device 100 may sequentially obtain audio in different directions through directional microphone scanning during capturing the video.

According to various embodiments of the present disclosure, in operation 703, the electronic device 100 may recognize an object included in the captured image. When multiple objects are included in the image, the electronic device 100 may recognize each of the multiple objects.

According to various embodiments of the present disclosure, in operation 705, the electronic device 100 may infer an object of interest from the extracted multiple objects. The electronic device 100 may infer an object of interest by comparing the similarity between the pre-registered object of interest and the extracted object. According to an embodiment of the present disclosure, the electronic device 100 may infer an object of interest via the similarity determination based on an image feature of the object. According to another embodiment, the electronic device 100 may infer an object of interest on the basis of a result of separately performing the similarity determination based on the voice feature and the similarity determination based on the image feature.

The electronic device 100 may detect a candidate direction in which it is determined that there is an object of interest by determining the voice feature similarity between audio in different directions obtained during capturing the video and the registered object of interest. According to an embodiment of the present disclosure, the electronic device 100 may detect the candidate direction by determining the voice feature similarity between the object of interest and the audio in different directions, which is sequentially obtained through directional microphone scanning in operation 701.

According to an embodiment of the present disclosure, the electronic device 100 may determine the similarity using the voice learning model. The voice learning model may be trained through supervised learning that uses the voice of the registered object of interest stored in the electronic device 100 as training data. The electronic device 100 may input audio obtained in different directions into the voice learning model, and as a result, may obtain the object of interest information having high voice similarity. In addition, since the electronic device 100 identifies the direction of the audio in which the object of interest information with high voice similarity is obtained, the candidate direction in which it is expected that there is an object of interest may be detected. In addition, the electronic device 100 may additionally use a voice filter. The voice filter may be designed to emphasize speech corresponding to the voice feature of the object of interest. When the electronic device 100 obtains the object of interest object having high voice similarity, the electronic device 100 obtains the audio by applying a voice filter corresponding to the object of interest, and determines the similarity by inputting the obtained audio into the voice learning model, thereby improving the accuracy of the determination.

In addition, the electronic device 100 may detect a candidate object having that similar to an image feature of the registered object of interest from the captured video in operation 701. According to an embodiment, the electronic device 100 may determine the similarity using the image learning model. The image learning model may be trained through supervised learning using an image including the registered object of interest in the electronic device 100 as training data. The electronic device 100 may extract the object from the obtained image data, perform preprocessing on the extracted object so that the size, angle of view, and the brightness of the image for the extracted objects become similar as possible as to the image used when training the image learning model, and input the preprocessed object into the image training model, thereby obtaining the object of interest information having high image similarity. According to an embodiment of the present disclosure, the electronic device 100 inputs only objects obtained in the candidate direction detected based on the voice learning model into the image learning model and checks the result, whereby it is possible to detect the object of interest in a faster time compared to when inputting all extracted objects.

According to another embodiment, the electronic device 100 may obtain information that there are no objects of interest and there are only general objects with high image similarity. In addition, the electronic device 100 may determine that there are no objects of interest and general objects, and there are only other objects.

According to various embodiments of the present disclosure, the electronic device 100 may infer that all the objects of interest detected based on the image learning model are included in the image. According to another embodiment, the electronic device 100 may infer a final object of interest by comparing the first candidate object detected based on the voice learning model with the second candidate object detected based on the image learning model. For example, the electronic device 100 may infer an object included in both the first candidate object and the second candidate object as the object of interest included in the image. According to various embodiments of the present disclosure, the number of objects of interest that are inferred to be included in the image may be one or more. According to another embodiment, the electronic device 100 may infer that objects of interest are not present and only general objects are present in the image. According to another embodiment, the electronic device 100 may infer that objects of interest and general objects are not present and only other objects are present in the image.

According to various embodiments of the present disclosure, in operation 707, the electronic device 100 may identify the distribution of the objects of interest. As an example, the electronic device 100 may determine the location of the object of interest, the distance between the electronic device 100 and the object of interest, or the importance of the object of interest. As another example, when objects of interest are present and only general objects are present in the image, the electronic device 100 may identify the location of the general object or the distance between the electronic device 100 and the general object.

According to various embodiments of the present disclosure, in operation 709, the electronic device 100 may allocate audio focusing to each of the objects of interest on the basis of identified distribution. According to an embodiment, the electronic device 100 may perform audio focusing by adjusting the activity of a plurality of microphones (for example, the microphones 122a, 122b, and 122c of FIG. 6). For example, the electronic device 100 may be set to have a high activity for a microphone directed toward an object of interest with high importance and have a low activity for a microphone directed toward an object of interest with low importance, thereby performing the audio focusing allocation on the basis of the importance of the object of interest. According to an embodiment, the activity of each microphone may be determined on the basis of a product of the distance between the electronic device 100 and the object of interest and the importance of the object of interest. For example, although the importance of the object of interest is relatively low, when the object of interest is far from the electronic device 100, the activity of the microphone may be greater compared to that of the object of interest with high importance.

According to various embodiments, additionally in operation 711, the electronic device 100 may apply voice filtering to the object of interest and reallocate audio focusing in consideration of voice filtering. In order to perform the operation 711, the electronic device 100 may use an object recognition technique and a voice analysis technique. According to an embodiment, the object recognition technology and the voice analysis technology may be based on artificial intelligence technology.

The electronic device 100 may analyze the voice of the object selected as the object of interest, identify the feature, and design the voice filter in such a manner as to optimally obtain the voice of the object according to the feature, thereby applying voice filtering. In addition, the electronic device 100 may store the designed voice filter in the memory 170. When the voice filter for the selected object of interest is already designed and stored in the memory 170, the electronic device 100 may apply the voice filtering using the corresponding voice filter.

After applying the voice filtering, the electronic device 100 may perform audio focusing allocation in consideration of the filtering effect. According to an embodiment of the present disclosure, the electronic device 100 may adjust the activity of the microphone so that the degree of emphasis of the voice from the object of interest after applying the voice filtering is equal to or greater than the degree of emphasis before applying the voice filtering. This additional allocation of voice filtering may enhance the emphasis on the voice from the object of interest.

According to an embodiment, when only one object of interest is included in the image, the electronic device 100 may perform audio focusing on the corresponding object. For example, the electronic device 100 may control the microphone so that the direction in which the directional microphone array is focused becomes a direction in which the object of interest is located. According to another embodiment, when multiple objects of interest are included in the image, the electronic device 100 may allocate audio focusing to each of the multiple objects of interest. For example, the electronic device 100 may allocate audio focusing by adjusting activity for a plurality of microphones included in the directional microphone array. The electronic device 100 may allocate audio focusing on the basis of the importance of each of the multiple objects of interest included in the image. The electronic device 100 performs control to set a high activity for a microphone directed toward the object of interest with a high importance to have a high activity, and set a low activity for a microphone directed toward the object of interest having a low importance, thereby allocating the audio focusing.

According to another embodiment, when the object of interest is not included and only one general object is included in the image, the electronic device 100 may control the microphone so that the direction in which the directional microphone array focuses becomes the location of the general object. When only multiple general objects are included in the image, the electronic device 100 may allocate the audio focusing to each of the multiple general objects. Herein, the electronic device 100 may control the microphone under the assumption that the multiple general objects have the same importance.

According to various embodiments of the present disclosure, the electronic device 100 may additionally obtain a video by applying a voice filter corresponding to each object of interest included in the image while emphasizing the voice of each object of interest. According to another embodiment, when objects of interest are present and only general objects are present in the image, the electronic device 100 may obtain the video while applying a voice filter commonly created for the general object to emphasize the speech of the general object. When only other objects are present in the image, the electronic device 100 may not apply a voice filter.

By the above-described operation, the electronic device 100 may capture a video in which the speech of the object of interest is emphasized and the audio corresponding to the noise is diminished, since the voice filtering is performed by automatically applying the voice filter when capturing the video.

In the above-described flow chart, the object of interest has been already registered so that related information may be stored in the memory 170. The electronic device 100 recognizes that the user tags a specific object in the video being captured to select the object as the object of interest, or the electronic device 100 selects the frequency of the object on the basis of the frequency in which the object appears in the image or video stored in the memory 170. As an example, the electronic device 100 may select an object of interest by obtaining the frequency by extracting and clustering an object included in an image of the memory 170 on the basis of an artificial neural network model.

Figure 8:
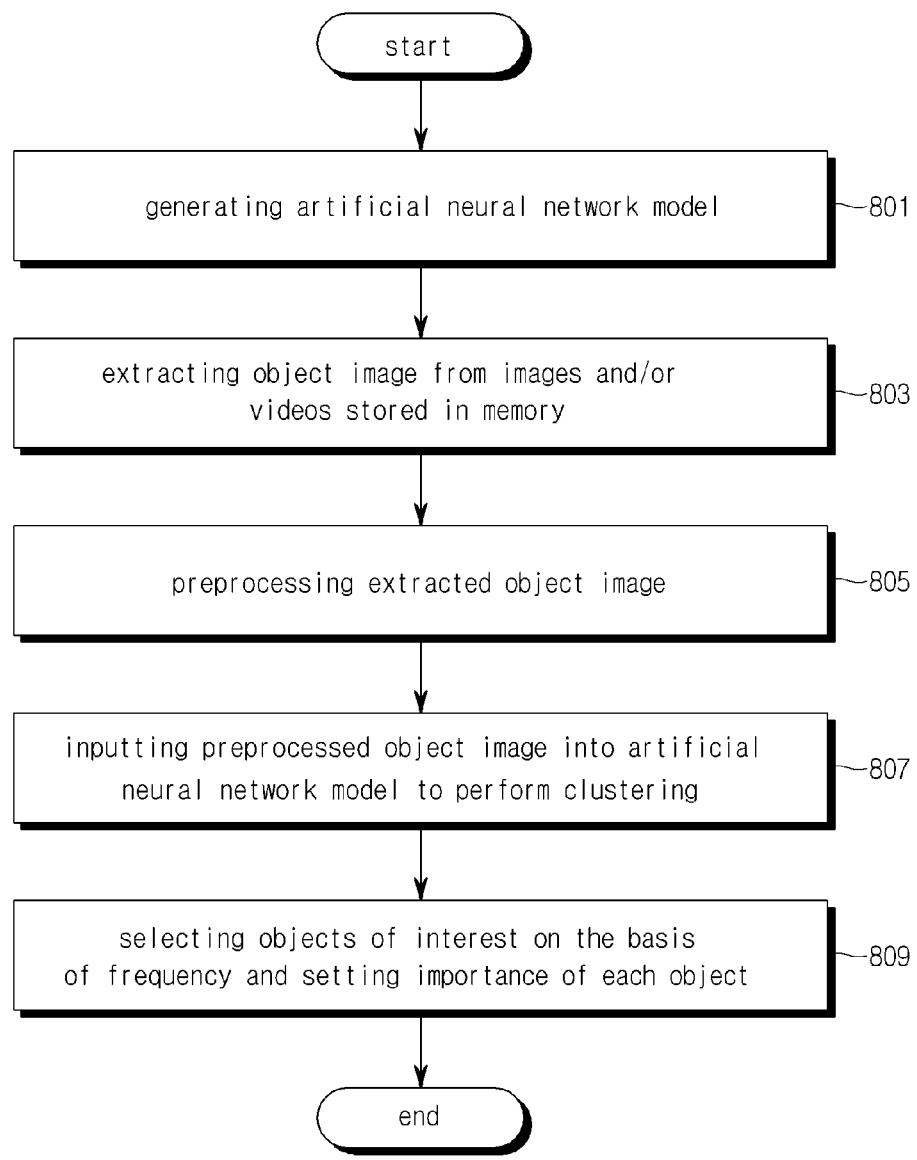
FIG. 8 is a flowchart illustrating an operation in which an electronic device selects an object of interest on the basis of an artificial neural network model according to various embodiments of the present disclosure.

FIG. 8 is a flowchart illustrating an operation in which the electronic device 100 selects an object of interest on the basis of an artificial neural network model, according to various embodiments of the present disclosure. The operations according to the flowchart shown in FIG. 8 may be implemented by an electronic device (e.g., electronic device 100 of FIG. 1) or at least one processor (e.g., processor 180 or learning processor 130 of FIG. 1) of the electronic device.

Referring to FIG. 8, in operation 801, the electronic device 100 may generate an artificial neural network model for clustering. According to an embodiment, the artificial neural network model may be a convolutional neural network shown in FIG. 3. The electronic device 100 may generate an artificial neural network model that has already been learned. The electronic device 100 may generate an artificial neural network model that is trained so that images of the same object are included in a cluster by using various images existing on the Internet as inputs. Such artificial neural network model may be a commercial product. According to another embodiment, the electronic device 100 may store the learned parameters for the artificial neural network model for clustering in the memory 170, so that separate learning may be not required.

According to various embodiments of the present disclosure, in operation 803, the electronic device 100 may extract an object image from an image stored in the memory 170. When multiple objects are present in one image, the object image may be extracted by separating each object. The electronic device 100 may perform an operation of extracting an object image from an image by using an artificial neural network or by using a typical image processing and recognition program.

In operation 805, the electronic device 100 may preprocess the obtained object images. According to an embodiment of the present disclosure, the electronic device 100 may perform preprocess so that the size, the angle of view, and the brightness of the corresponding image becomes similar as possible as for all the obtained objects.

In operation 807, the electronic device 100 may input the preprocessed object image into the artificial neural network model generated in the operation 801 to perform clustering. The clustering may refer to a function of collecting object images having similar features. The artificial neural network model extracts features from an input object image and collects object images with similar features to each other for the clustering.

In operation 809, the electronic device 100 may select and register an object of interest on the basis of the number of images included in each cluster. As an example, the electronic device 100 may select and register, as the object of interest, an object in which the number of images included in the cluster is more than the predetermined number. As another example, the electronic device 100 may sequentially arrange the objects from the largest number of images to the smallest number of images, and selects and registers, as the object of interest, an object having the predetermined number of images in front of the sequence. In addition, the electronic device 100 may store the importance information when registering the object of interest. The importance of each object of interest may be determined in proportion to the number of images included in the cluster. According to an embodiment, the electronic device 100 may be provided so that the importance is high when the number of images included in the cluster is large, and the importance is low when the number of images is small.

Through the above-described operation flow, the electronic device 100 may register an object of interest and set the importance.

The electronic device 100 may use an artificial neural network model to extract the voice feature and the image feature of the object of interest.

Figure 9:
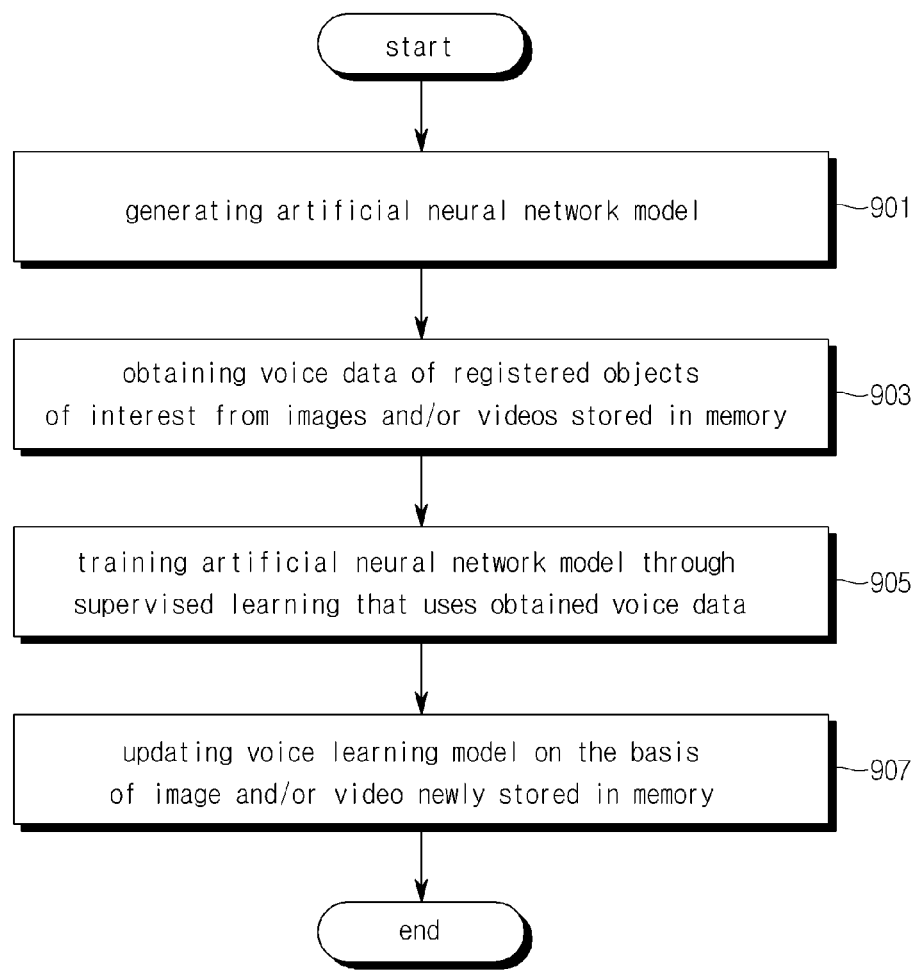
FIG. 9 is a flowchart illustrating an operation in which an electronic device learns the voice feature of an object of interest on the basis of an artificial neural network model according to various embodiments of the present disclosure.

FIG. 9 is a flowchart illustrating an operation in which an electronic device 100 learns the voice feature of an object of interest on the basis of an artificial neural network model according to various embodiments of the present disclosure. The operations according to the flowchart shown in FIG. 9 may be implemented by an electronic device (e.g., electronic device 100 of FIG. 1) or at least one processor (e.g., processor 180 or learning processor 130 of FIG. 1) of the electronic device.

Referring to FIG. 9, in operation 901, the electronic device 100 may generate an artificial neural network model for storing voice features. In one embodiment, the artificial neural network model may be a cyclic artificial neural network suitable for processing sequential data or a LSTM or GRU obtained by modifying the same.

According to various embodiments of the present disclosure, in operation 903, the electronic device 100 may obtain voice data of registered objects of interest from the image stored in the memory 170.

In operation 905, the electronic device 100 trains the artificial neural network model generated in operation 901 to obtain a voice learning model through supervised learning that uses the obtained voice data and a label indicating the object of interest to which the voice data belong. The obtained voice learning model reflects the voice feature of the object of interest, and the electronic device 100 may identify the input voice data to be one of the objects of interest or may identify the input voice data not to be voice of the object of interest.

In operation 907, after the voice learning model is generated, when there is an image captured by the user and/or an image newly stored in the memory 170, the electronic device 100 may update the voice learning model on the basis of the same. According to an embodiment, the electronic device 100 may perform supervised learning by inputting the newly obtained voice data and the label into the voice learning model, thereby updating the voice learning model. According to another embodiment, the electronic device 100 may newly perform operations 901 to 905 to generate a completely new voice learning model.

According to an embodiment of the present disclosure, in operation 907, the voice learning model may be updated when there is a user request or when the electronic device 100 determines that the voice learning model is required to be updated (e.g., when a matching probability is lower than a predetermined value).

Figure 10:
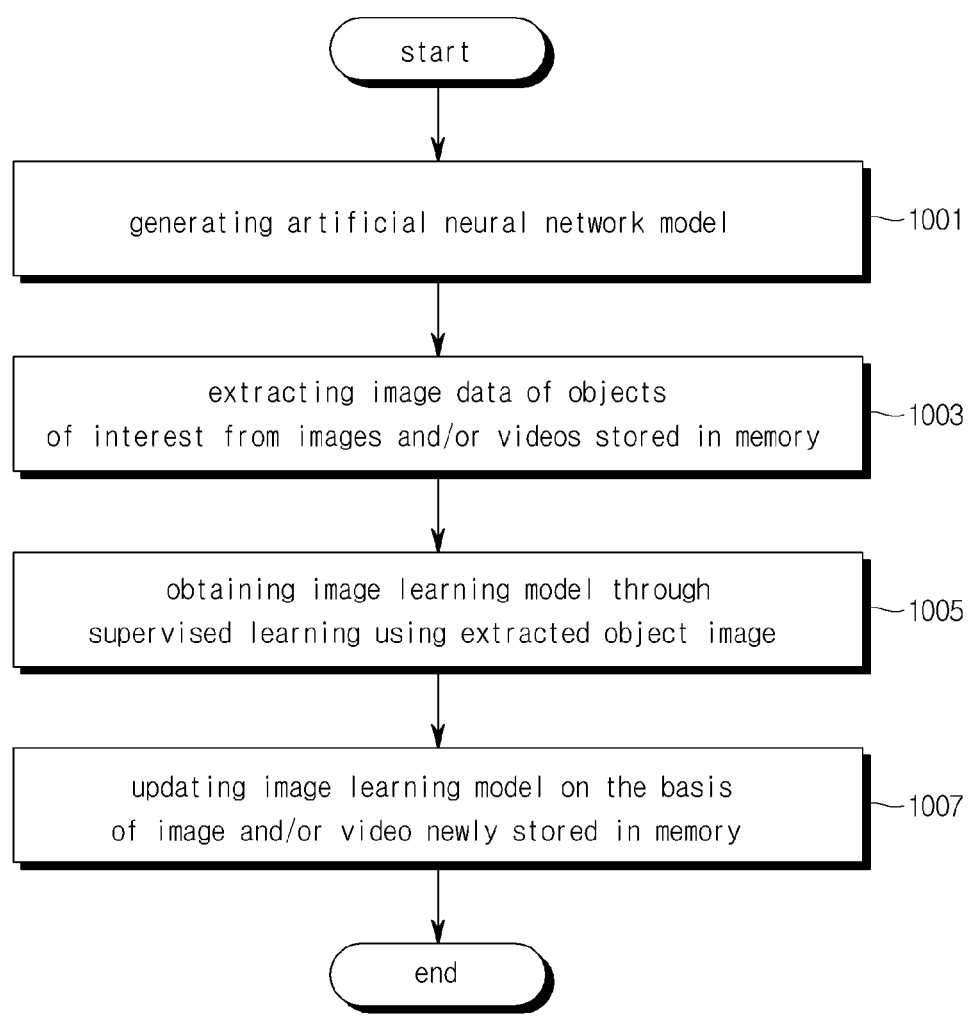
FIG. 10 is a flowchart illustrating an operation in which an electronic device learns the image feature of an object of interest on the basis of an artificial neural network model according to various embodiments of the present disclosure.

FIG. 10 is a flowchart illustrating an operation in which an electronic device 100 learns the image feature of an object of interest on the basis of an artificial neural network model according to various embodiments of the present disclosure. The operations according to the flowchart shown in FIG. 10 may be implemented by an electronic device (e.g., electronic device 100 of FIG. 1) or at least one processor (e.g., processor 180 or learning processor 130 of FIG. 1) of the electronic device.

Referring to FIG. 10, in operation 1001, the electronic device 100 may generate an artificial neural network model for storing image features. In one embodiment, the artificial neural network model may be a convolutional neural network having good performance in extracting features from two-dimensional images.

According to various embodiments of the present disclosure, in operation 1003, the electronic device 100 may extract image data of registered objects of interest from an image stored in the memory 170. According to another embodiment, image data of the registered objects of interest may be selected from among the images extracted during the clustering of FIG. 8. Herein, it is possible to reduce waste of repeating the same operation.

In operation 1005, the electronic device 100 may obtain an image learning model by training an artificial neural network model generated in the operation 1001 through supervised learning using the extracted object image as training data. The obtained image learning model reflects the image feature of the object of interest, and the electronic device 100 may be used to determine whether at least one of the objects of interest is included in the input image.

In operation 1007, after the image learning model is generated, when there is an image captured by the user and/or an image newly stored in the memory 170, the electronic device 100 may update the image learning model on the basis of the same. According to an embodiment, the electronic device 100 may perform supervised learning by inputting the image data and label of the newly obtained object of interest into the image learning model, thereby updating the image learning model. According to another embodiment, the electronic device 100 may newly perform operations 1001 to 1005 to generate a completely new image learning model.

According to an embodiment of the present disclosure, in operation 1007, the image learning model may be updated when there is a user request or when the electronic device 100 determines that the image learning model is required to be updated (e.g., when a matching probability is lower than a predetermined value).

According to various embodiments, a method of operating a device (e.g., an electronic device 100 of FIG. 1) may comprise registering objects of interest, capturing a video, displaying the captured video on a display, recognizing at least one object included in the captured video, inferring at least one object of interest included in the captured video from the recognized at least one object, identifying distribution of the at least one object of interest and performing audio focusing on the at least one object of interest by adjusting activity of each of multiple microphones included in a microphone array based on the identified distribution of the at least one object of interest.

According to various embodiments, the method may further comprise identifying a voice feature of at least one of the registered objects of interest, generating a voice filter capable of emphasizing the identified voice feature, and applying the generated voice filter to the captured video to emphasize a voice of the inferred at least one object of interest.

According to various embodiments, the registering of the objects of interest includes extracting an object from the captured videos stored in a memory, selecting an object with tagging information indicating that the object is selected as an object of interest, wherein the object is selected from among the extracted objects, setting an importance of the selected object based on a number of times tagged by a user, wherein the selected object along with the set importance is registered as an object of interest.

According to various embodiments, the registering of the objects of interest includes extracting an object from the captured videos stored in a memory, selecting an object based on an appearing frequency in the captured videos stored in the memory and setting an importance of the selected object based on the appearing frequency in the captured videos, wherein the selected object along with the set importance is registered as an object of interest.

According to various embodiments, the registering of the objects of interest further includes generating an artificial neural network model trained for object clustering, extracting object images from the captured videos stored in a memory, preprocessing the extracted object images, inputting the preprocessed extracted object images into the generated artificial neural network model to cluster the preprocessed extracted object images with images having similar features and determining a frequency in which an object appears in the captured videos based on a number of object images included in the cluster.

According to various embodiments, the inferring of the at least one object of interest included in the captured video from the recognized at least one object includes obtaining voice data of the captured video while sequentially changing a direction in which the microphone array is focused, determining similarity between a voice data feature of the captured video and a particular voice data feature of a registered object of interest from among the registered objects of interest to detect a candidate direction in which a particular object of interest is expected to be present, extracting an object that is in the candidate direction from the captured video and determining a similarity between an image feature of the extracted object and a particular image feature of the registered object of interest to infer the at least one object of interest.

According to various embodiments, the inferring the at least one object of interest included in the captured video from the recognized at least one object includes obtaining voice data of the video while sequentially changing a direction in which the microphone array is focused, determining a similarity between a voice data feature of the captured video and a particular voice data feature of registered objects of interest to detect a first object capable of being a particular object of interest and a candidate direction in which the first object is expected to be present, extracting an object that is in the candidate direction from the captured video, determining similarity between an image feature of the extracted object and a particular image feature of the registered object of interest to infer a second object and inferring an object included in both the first object and the second object as the at least one object of interest.

According to various embodiments, the determining the similarity between the voice data feature of the captured video and the registered voice data feature of the object of interest includes generating an artificial neural network model, obtaining voice data of the registered object of interest from captured videos stored in a memory, training the generated artificial neural model using the obtained voice data of the object of interest to be classified according to a particular voice data feature of the objects of interest and inputting the obtained voice data of the video into the generated artificial neural network to determine the similarity of the voice data feature with the objects of interest.

According to various embodiments, the determining the similarity between the image feature of the extracted object and the particular image feature of the registered object of interest includes generating an artificial neural network model, obtaining image data of the registered objects of interest from the captured videos stored in a memory, training the generated artificial neural model using the obtained image data of the object of interest to be classified according to a particular feature of the objects of interest and inputting the obtained video into the trained generated artificial neural network model to determine the similarity of the image feature of the extracted object with the objects of interest.

According to various embodiments, the performing of the audio focusing includes allocating the audio focusing into the at least one object of interest by adjusting the activity of each of the multiple microphones based on multiple objects of interest being recognized.

As described above, the device and method disclosed in the present disclosure may provide automatic audio focusing without user intervention, thereby providing satisfactory video capturing result.

According to various embodiments of the present disclosure, a device and method may perform audio focusing on multiple objects of interest that issue a voice, thereby emphasizing and recording the voice issued by the multiple objects. Also, a device and method according to various embodiments proposed by the present disclosure may automatically select multiple objects that may be subject to audio focusing. In addition, the device and method according to various embodiments of the present disclosure may analyze features of the voice generated by the object of interest to generate the emphasis filter, thereby further emphasizing the voice generated by the object.

What is claimed is:

1. A device, comprising: a camera configured to capture a video; a microphone array composed of multiple microphones; a display configured to display the video; and at least one processor configured to: register objects of interest; cause a display of the captured video on the display; recognize at least one object included in the captured video; infer at least one object of interest included in the captured video from the recognized at least one object; identify distribution of the inferred at least one object of interest; and perform automatic audio focusing on the at least one object of interest by adjusting activity of each of the multiple microphones based on the identified distribution of the inferred at least one object of interest.

2. The device of claim 1, wherein the at least one processor is further configured to:
identify a voice feature of at least one of the registered objects of interest;
generate a voice filter capable of emphasizing the identified voice feature; and
apply the generated voice filter to the captured video to emphasize a voice of the inferred at least one object of interest.

3. The device of claim 1, further comprising a memory configured to store the captured videos, wherein registering the objects of interest includes:
extracting an object from the captured videos stored in the memory;
selecting an object with tagging information indicating that the object is selected as an object of interest, wherein the object is selected from among the extracted object; and
setting an importance of the selected object based on a number of times tagged by a user, wherein the selected object along with the set importance is registered as an object of interest.

4. The device of claim 1, further comprising a memory configured to store the captured videos,
wherein registering the objects of interest includes:
extracting an object from the captured videos stored in the memory;
selecting an object based on an appearing frequency in the captured videos stored in the memory; and
setting an importance of the selected object based on the appearing frequency in the captured videos, wherein the selected object along with the set importance is registered as an object of interest.

5. The device of claim 4, wherein registering the objects of interest includes:
generating an artificial neural network model trained for object clustering;
extracting object images from the captured videos stored in the memory;
preprocessing the extracted object images;
inputting the preprocessed extracted object images into the generated artificial neural network model to cluster the preprocessed extracted object images with images having similar features; and
determining a frequency in which an object appears in the captured videos based on a number of object images included in the cluster.

6. The device of claim 1, wherein inferring the at least one object of interest included in the captured video from the recognized at least one object includes:
obtaining voice data of the captured video while sequentially changing a direction in which the microphone array is focused;
determining a similarity between a voice data feature of the captured video and a particular voice data feature of a registered object of interest from among the registered objects of interest to detect a candidate direction in which a particular object of interest is expected to be present;
extracting an object that is in the candidate direction from the captured video; and
determining a similarity between an image feature of the extracted object and a particular image feature of the registered object of interest to infer the at least one object of interest.

7. The device of claim 6, determining the similarity between the voice data feature of the captured video and the particular voice data feature of the registered object of interest includes:
generating an artificial neural network model; obtaining voice data of the registered objects of interest from the captured videos stored in a memory;
training the generated artificial neural network model by using the obtained voice data of the objects of interest to be classified according to a particular voice data feature of the objects of interest; and
inputting the obtained voice data into the generated artificial neural network to determine the similarity of the voice data feature with the objects of interest.

8. The device of claim 6, wherein determining the similarity between the image feature of the extracted object and the particular image feature of the registered object of interest includes:
generating an artificial neural network model;
obtaining image data of the registered objects of interest from the captured videos stored in a memory;
training the generated artificial neural network model using the obtained image data of the object of interest to be classified according to a particular image feature of the objects of interest; and
inputting the obtained image data into the trained generated artificial neural network model to determine the similarity of the image feature of the extracted object with the objects of interest.

9. The device of claim 1, wherein inferring the at least one object of interest included in the captured video from the recognized at least one object includes:
obtaining voice data of the captured video while sequentially changing a direction in which the microphone array is focused;
determining a similarity between a voice data feature of the captured video and a particular voice data feature of a registered object of interest from among the registered objects of interest to detect a first object capable of being a particular object of interest and a candidate direction in which the first object is expected to be present;
extracting an object that is in the candidate direction from the captured video;
determining a similarity between an image feature of the extracted object and a particular image feature of the registered object of interest to infer a second object; and
inferring a specific object included in both the detected first object and the inferred second object as the at least one object of interest.

10. The device of claim 1, wherein performing automatic audio focusing includes allocating the audio focusing into the at least one object of interest by adjusting the activity of each of the multiple microphones based on multiple objects of interest being recognized.

11. A method of operating an electronic device, the method comprising: registering, by the electronic device, objects of interest; capturing, by the electronic device, a video; displaying, by the electronic device, the captured video on a display; recognizing, by the electronic device, at least one object included in the captured video; inferring, by the electronic device, at least one object of interest included in the captured video from the recognized at least one object; identifying, by the electronic device, distribution of the inferred at least one object of interest; and performing, by the electronic device, automatic audio focusing on the at least one object of interest by adjusting activity of each of multiple microphones included in a microphone array based on the identified distribution of the inferred at least one object of interest.

12. The method of claim 11, further comprising: identifying, by the electronic device, a voice feature of at least one of the registered objects of interest; generating, by the electronic device, a voice filter capable of emphasizing the identified voice feature; and applying, by the electronic device, the generated voice filter to the captured video to emphasize a voice of the inferred at least one object of interest.

13. The method of claim 11, wherein the registering of the objects of interest includes: extracting, by the electronic device, an object from the captured videos stored in a memory; selecting, by the electronic device, an object with tagging information indicating that the object is selected as an object of interest, wherein the object is selected from among the extracted objects; setting, by the electronic device, an importance of the selected object based on a number of times tagged by a user, wherein the selected object along with the set importance is registered as an object of interest.

14. The method of claim 11, wherein the registering of the objects of interest includes: extracting, by the electronic device, an object from the captured videos stored in a memory; selecting, by the electronic device, an object based on an appearing frequency in the captured videos stored in the memory; setting, by the electronic device, an importance of the selected object based on the appearing frequency in the captured videos, wherein the selected object along with the set importance is registered as an object of interest.

15. The method of claim 14, wherein the registering of the objects of interest further includes: generating, by the electronic device, an artificial neural network model trained for object clustering; extracting, by the electronic device, object images from the captured videos stored in a memory; preprocessing, by the electronic device, the extracted object images; inputting, by the electronic device, the preprocessed extracted object images into the generated artificial neural network model to cluster the preprocessed extracted object images with images having similar features; and determining, by the electronic device, a frequency in which an object appears in the captured videos based on a number of object images included in the cluster.

16. The method of claim 11, wherein the inferring of the at least one object of interest included in the captured video from the recognized at least one object includes: obtaining, by the electronic device, voice data of the captured video while sequentially changing a direction in which the microphone array is focused; determining, by the electronic device, similarity between a voice data feature of the captured video and a particular voice data feature of a registered object of interest from among the registered objects of interest to detect a candidate direction in which a particular object of interest is expected to be present; extracting, by the electronic device, an object that is in the candidate direction from the captured video; and determining, by the electronic device, a similarity between an image feature of the extracted object and a particular image feature of the registered object of interest to infer the at least one object of interest.

17. The method of claim 16, wherein the determining the similarity between the voice data feature of the captured video and the registered voice data feature of the object of interest includes: generating, by the electronic device, an artificial neural network model; obtaining, by the electronic device, voice data of the registered object of interest from captured videos stored in a memory; training, by the electronic device, the generated artificial neural model using the obtained voice data of the object of interest to be classified according to a particular voice data feature of the objects of interest; and inputting, by the electronic device, the obtained voice data of the video into the generated artificial neural network to determine the similarity of the voice data feature with the objects of interest.

18. The method of claim 16, wherein the determining the similarity between the image feature of the extracted object and the particular image feature of the registered object of interest includes: generating, by the electronic device, an artificial neural network model; obtaining, by the electronic device, image data of the registered objects of interest from the captured videos stored in a memory; training, by the electronic device, the generated artificial neural model using the obtained image data of the object of interest to be classified according to a particular feature of the objects of interest; and inputting, by the electronic device, the obtained video into the trained generated artificial neural network model to determine the similarity of the image feature of the extracted object with the objects of interest.

19. The method of claim 11, wherein the inferring the at least one object of interest included in the captured video from the recognized at least one object includes: obtaining, by the electronic device, voice data of the video while sequentially changing a direction in which the microphone array is focused; determining, by the electronic device, a similarity between a voice data feature of the captured video and a particular voice data feature of registered objects of interest to detect a first object capable of being a particular object of interest and a candidate direction in which the first object is expected to be present; extracting, by the electronic device, an object that is in the candidate direction from the captured video; determining, by the electronic device, similarity between an image feature of the extracted object and a particular image feature of the registered object of interest to infer a second object; and inferring, by the electronic device, an object included in both the first object and the second object as the at least one object of interest.

20. The method of claim 11, wherein the performing of the automatic audio focusing includes allocating the audio focusing into the at least one object of interest by adjusting the activity of each of the multiple microphones based on multiple objects of interest being recognized.

* * * * *